Nov. 4, 1952 K. A. YOUNG 2,617,039

HARMONIC FREQUENCY SELECTOR

Filed April 29, 1947 2 SHEETS—SHEET 1

INVENTOR
KENNETH A. YOUNG
BY Elmer J. Gorn
ATTORNEY

Nov. 4, 1952 K. A. YOUNG 2,617,039

HARMONIC FREQUENCY SELECTOR

Filed April 29, 1947 2 SHEETS—SHEET 2

INVENTOR
KENNETH A. YOUNG.
BY Elmer J. Gorn
ATTY.

Patented Nov. 4, 1952

2,617,039

UNITED STATES PATENT OFFICE 2,617,039

HARMONIC FREQUENCY SELECTOR

Kenneth A. Young, Waban, Mass., assignor to Raytheon Manufacturing Company, Newton, Mass., a corporation of Delaware Application April 29, 1947, Serial No. 744,623

6 Claims. (Cl. 250—36)

This invention relates in general to apparatus for generating an electric wave having a particular frequency from selected harmonics of a single oscillator or a related group of oscillators, and in particular to a device for automatically selecting a proper and most advantageous combination of harmonics to provide a desired particular frequency.

In a paper published May 5, 1943, before the Wireless Section of the Institution of Electrical Engineers, London, England, and later in the "Journal of the Institution of Electrical Engineers," vol. 90, part 3, December 1943, pages 165 to 180, inclusive, by H. J. Finden, there is described an apparatus for generating a desired frequency by synthesis from selected harmonics of a group of harmonics and subharmonics of a standard frequency, the apparatus yielding any frequency that is harmonically related to a multiple or a submultiple of the standard frequency. In this apparatus, the functioning of the various filters for the selection of proper harmonics, and selection of the proper sidebands when harmonics are combined, is only partly automatic, and the lack of completely automatic functioning of the synthesizer seriously limits the use thereof.

In the present invention, it is accordingly the main object to provide a computer which operates or provides information for the operation of a frequency synthesizer of the above-described kind in a fully automatic fashion.

It is another object of this invention to provide a method and means to combine selected harmonics of a single oscillator or a related group of oscillators to provide an electric wave of a desired frequency in such a fashion that electric waves of other frequencies that may be simultaneously generated in the process of combination are spaced as far as possible in frequency from the desired wave to permit adequate filtering.

It is another object of the invention to provide means for automatically making a selection, than which there is none better, of the proper harmonics required to generate a desired frequency.

It is a further object of the invention to provide such means which is simple to operate, reliable in operation, and is constructed with a minimum of complexity.

Figure 1:
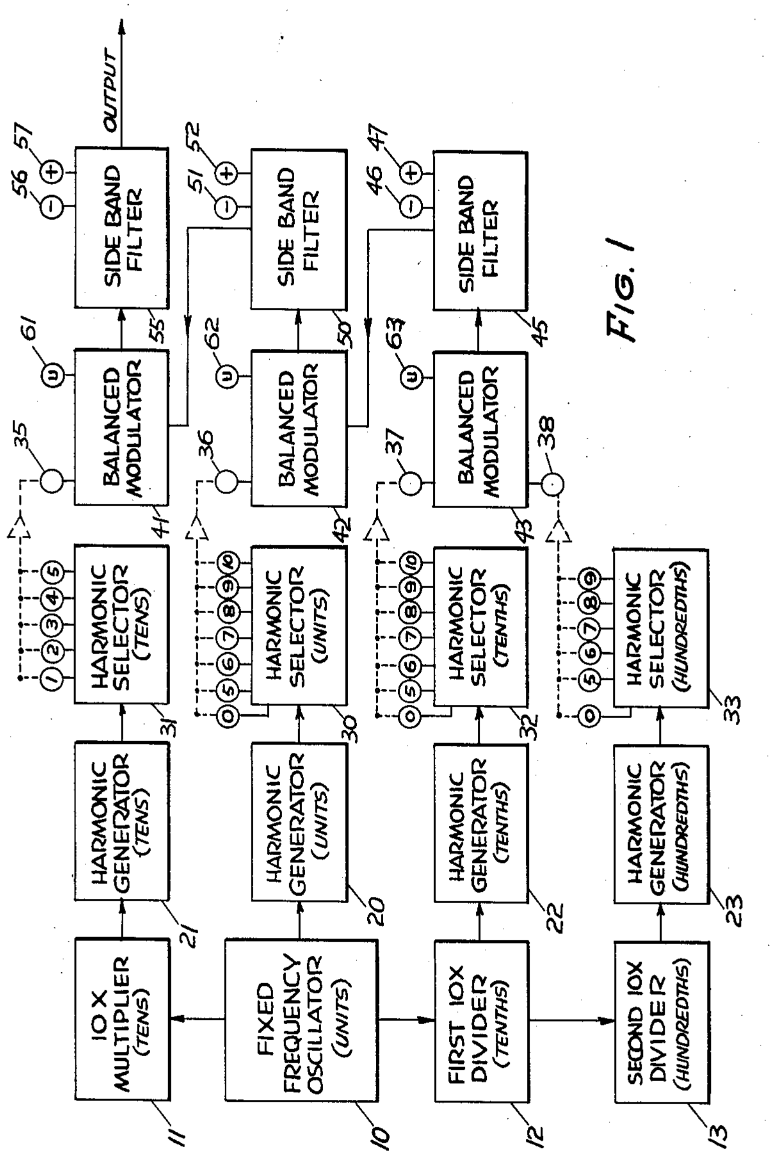
Figure 2:
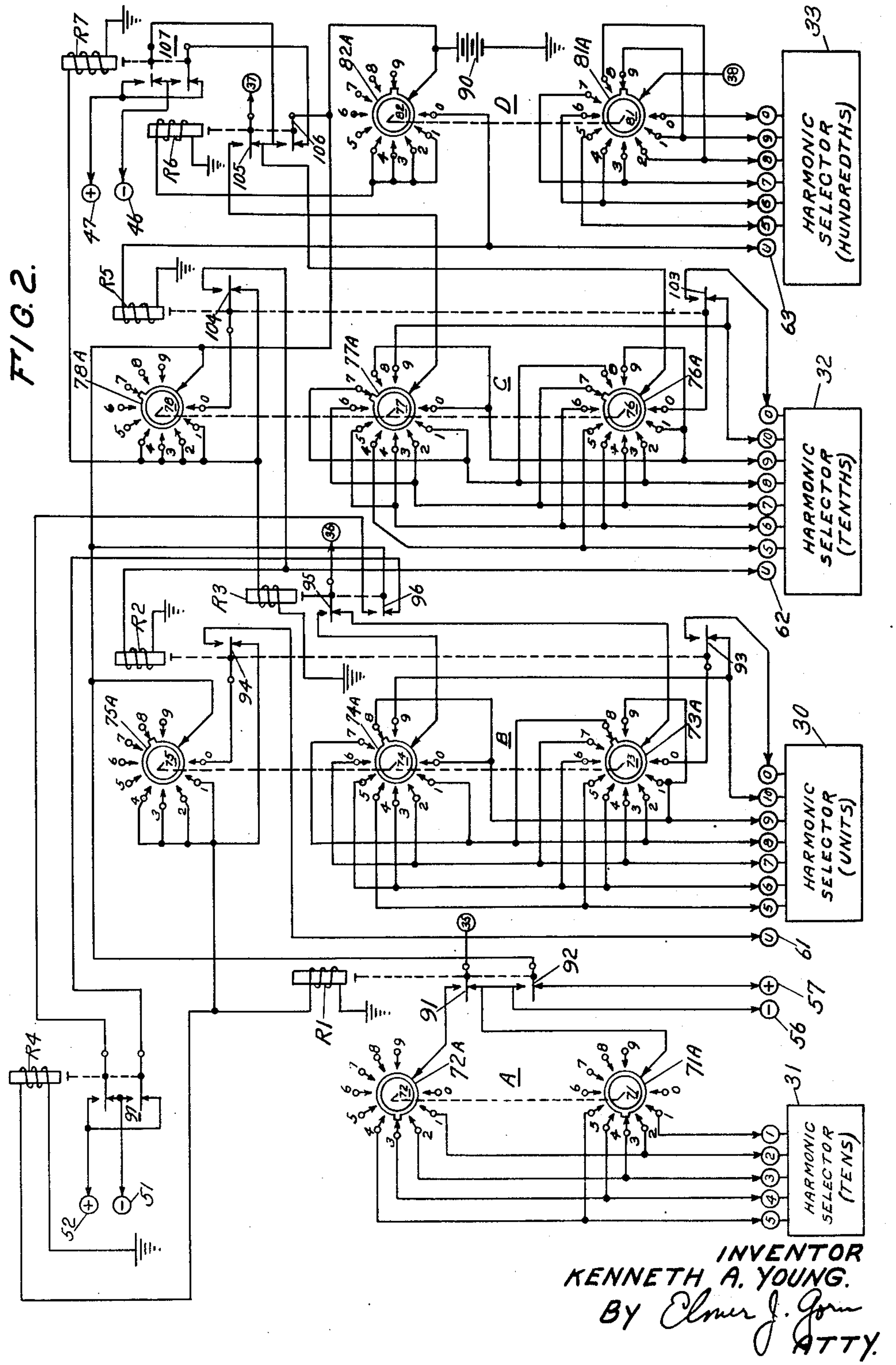

The foregoing and other and further objects of the invention will become apparent from the following description of an exemplary embodiment thereof, reference being had to the accompanying drawings, wherein:

Fig. 1 illustrates in block diagram form an apparatus for generating various frequencies from selected harmonics of a single oscillator; and Fig. 2 illustrates in electrical scheme a device for selecting harmonics.

The frequency generator illustrated in Fig. 1 is designed to provide any frequency in the band from 10 megacycles per second to 50 megacycles per second, in steps of 10 kilocycles per second. This generator is similar in nature to that described by Finden in the above-mentioned article, and only its essential elements and their interrelation will be described herein. A fixed frequency oscillator 10, which may be crystal controlled, is arranged to oscillate at 1 megacycle per second. A frequency multiplier 11 is actuated by a portion of the output of the fixed frequency oscillator and in turn provides a 10 megacycle per second wave, multiplying the initial frequency by ten. A first frequency divider 12 is also actuated by a portion of the output of the fixed frequency oscillator 10, and in turn provides a wave oscillating at 0.1 megacycles per second, dividing the initial frequency by ten. A second frequency divider 13, actuated by the 0.1 megacycle per second wave from the first divider 12, further divides the initial frequency by ten to provide a wave oscillator at 0.01 megacycle per second, or 10 kilocycles per second. There are now four sources 10 to 13, inclusive, of fixed frequencies which are related to each other in decade fashion.

Each of the decade fixed frequency sources 10 to 13, inclusive, actuates a harmonic generator 20, 21, 22, and 23, respectively. The harmonic generators are substantially identical in nature, but differ in that each is constructed and arranged to oscillate at a fundamental frequency which is substantially the same as the frequency of the particular decade source 10 to 13, inclusive, by which it is actuated. Otherwise the harmonic generators may all be multivibrators, or any other kind of oscillator or amplifier that is rich in harmonics.

The tens decade harmonic generator 21 feeds into a tens decade harmonic selector 31 which provides facilities for selecting any one of the first five harmonics of 10 megacycles per second, namely 10, 20, 30, 40, or 50 megacycles per second. The selector may comprise a set of selective filters, each of which passes one of the desired frequencies, and is equipped with five output terminals labelled 1, 2, 3, 4, and 5, respectively, each terminal being for the corresponding numbered harmonic of 10 megacycles per second. Thus terminal 1 of the tens decade selector 31 is a 10 mc./sec. output terminal, terminal 2 is a 20 mc./sec. output terminal, and so on to terminal 5 which is the 50 mc./sec. output terminal. The harmonic generator and selector is preferably built as a unit in which each frequency selective circuit (selective filters) is part of the generator. For an example, it may be an over-driven amplifier whose plate circuit can be tuned (or switched) to the wanted harmonic.

Selection of the particular harmonic that is desired may be made in any fashion, and a new method and apparatus for selecting harmonics will be described below. The harmonic that is selected is fed into a first balanced modulator 41 through an input terminal 35.

Considering now the units decade, the units harmonic generator 20 feeds into a units harmonic selector 30, which provides the fifth, sixth, seventh, eighth, ninth, and tenth harmonics of 1 mc./sec. at correspondingly numbered terminals 5, 6, 7, 8, 9, and 10, respectively. There is also a terminal labelled zero from which no signal is available, for a purpose that will appear below. A selected harmonic of 1 mc./sec. is fed into a second balanced modulator 42 at an input terminal 36 thereof. In the tenths decade, a tenths harmonic selector 32 is actuated by the tenths harmonic generator 22 and provides the fifth, sixth, seventh, eighth, ninth, and tenth harmonics of 0.1 mc./sec. at correspondingly numbered output terminals 5, 6, 7, 8, 9, and 10, respectively. Again there is a zero terminal at which no signal is available, and any one of these output terminals may selectively be connected to a third balanced modulator 43 at a first input terminal 37 thereof. The hundredths decade has a hundredths harmonic selector 33 which provides the fifth, sixth, seventh, eighth, and ninth harmonics of 10 kc./sec. at correspondingly numbered output terminals 5, 6, 7, 8, and 9, respectively, and a zero signal at a zero terminal. Any one of the output terminals of the hundredths harmonic selector 33 may be selectively connected to the third balanced modulator 43 at a second input terminal 38 thereof.

The third balanced modulator 43 feeds its output, which consists almost entirely of two signals of which the frequencies are, respectively, the sum and the difference of the frequencies brought in at the input terminals 37 and 38, to a first sideband filter 45. This filter has two control terminals 46 and 47 for determining whether the filter shall furnish the sum frequency (+) or the difference frequency (—). Determination is made by furnishing a voltage to the terminal bearing the desired algebraic sign (+) or (—), as will appear below. The output of the first sideband filter 45 is then fed into the second balanced modulator 42, where this output and the selected output from the units harmonic selector 30 are operated upon.

The second balanced modulator 42 also furnishes two signals which have, respectively, the sum and difference frequencies of the two input signals, and these two sum and difference frequency signals are fed into a second sideband filter 50, which in turn furnishes only one, the sum or the difference frequency, in accordance with the condition of the control terminals 51 and 52. Again a voltage is provided to the terminal bearing the desired algebraic sign (+) or (—) to select the desired frequency in the output. The output of the second sideband filter 50 is fed into the first balanced modulator 41.

The first balanced modulator 41 furnishes two output signals having frequencies which are, respectively, the sum and the difference of the selected frequency from the tens harmonic selector and the frequency provided by the second sideband filter 50, and furnishes these two signals to a third sideband filter 55. This filter furnishes either the sum frequency or the difference frequency as the final output frequency of the frequency generator, in accordance with which of the two control terminals 56 or 57 thereof is energized.

Each balanced modulator 41, 42, and 43 is provided with an unbalance control terminal 61, 62, and 63, respectively, by the energization of which the modulator is unbalanced and made to amplify only the signal fed thereinto from the energizing harmonic selector. A modulator is unbalanced when only one frequency is fed into it, that is, when a harmonic selector feeding it is set on "zero."

The frequency generator provides a desired frequency as follows.

Assume that an output frequency of 41.81 megacycles per second is desired. This frequency might be arrived at by adding the first hundredth decade harmonic or 0.01 mc./sec. from the hundredths harmonic selector 33 and the eighth tenths decade harmonic, or 0.80 mc./sec. from the tenths harmonic selector 32 in the third balanced modulator 43, then adding the resulting 0.81 mc./sec. signal to the first units harmonic or 1.0 mc./sec. from the units harmonic selector 30 in the second balanced modulator 42, and finally adding the then resulting 1.81 mc./sec. signal to the fourth tens harmonic, or 40 mc./sec. from the tens harmonic selector 31, to yield an output frequency of 41.81 mc./sec. The sideband filters 45, 50, and 55 are all arranged to provide the sum frequency rather than the difference frequency in each case.

The procedure just outlined has a defect in that the sum and difference frequencies existing in certain of the balanced modulators are too close together to permit clear cut separation of the two modulator output frequencies in the subsequent sideband filter. For example, when the frequencies 0.01 mc./sec. and 0.80 mc./sec. are fed into the third balanced modulator 43, the sum frequency that results is 0.81 mc./sec., while the difference frequency is 0.79 mc./sec., the separation being only 0.02 mc./sec. Separation of 0.81 mc./sec. and 0.79 mc./sec. in the first side band filter 45 is very difficult. Assuming however, that 0.81 mc./sec. can be separated, the mixture of 0.81 mc./sec. and 1.0 mc./sec. in the second balanced modulator 42 yields the sum frequency of 1.81 mc./sec. and the difference frequency of 0.19 mc./sec., which are widely separate, and hence easily separated in the second sideband filter 50; but, the subsequent mixture of 1.81 mc./sec. and 40 mc./sec. in the first balanced modulator 41 yields the sum frequency of 41.81 mc./sec. and the difference frequency of 38.19 mc./sec., which again are too close together for easy separation in the third sideband filter 55.

The separation of the sum and difference frequencies furnished by any one of the modulators 41, 42, or 43 should be at least as great as the difference between two adjacent harmonic orders of the higher decade employed to actuate the modulator. The process of synthesis of the desired frequency, 41.81 mc./sec., can be carried out to achieve such good separation by proper selection of sum and difference frequencies from the various modulators. To achieve the best possible sideband separation, the frequency 41.81 mc./sec. should be generated in the following manner.

Apply the ninth harmonic (0.09 mc./sec.) from the hundredths harmonic selector 33 and the ninth harmonic (0.90 mc./sec.) from the tenths harmonic selector 32 to the third balanced modulator 43, and take the difference frequency (0.81 mc./sec.) from the first sideband filter 45. The sum frequency is 0.99 mc./sec., which is 0.18 mc./sec. removed from 0.81 mc./sec. and from which 0.81 mc./sec. is easily separated. Then apply 0.81 mc./sec. and the ninth harmonic (9.0 mc./sec.) from the units harmonic selector 30 to the second balanced modulator 42, and take the difference frequency (8.19 mc./sec.) from the second sideband filter 50. The sum frequency in this case is 9.81 mc./sec., which is 1.62 mc./sec. removed from 8.19 mc./sec., and is easily separated therefrom. Finally apply the resulting 8.19 mc./sec. signal and the fifth harmonic (50.0 mc./sec.) from the tens harmonic selector 31 to the first balanced modulator 41, and take the difference frequency 41.81 mc./sec. from the third sideband filter 55. The sum frequency in this last operation is 58.19 mc./sec., which is 16.38 mc./sec. removed from 41.81 mc./sec., and easily separated from the desired frequency.

If a frequency is to be generated in which one or more of the four digits used to designate the frequency is zero, the zero output terminal from the harmonic selector corresponding to a zero digit is selected, and the modulator into which that selector feeds is unbalanced. Since the particular frequency generator under discussion generates frequencies from 10 to 50 mc./sec., the first digit is never zero, and the tens harmonic selector accordingly has no "zero" output terminal. A particular frequency may be designated as AB, CD, where: A is the first digit, B is the second digit, C is the third digit, and D is the fourth digit. The conditions under which a particular modulator must be unbalanced are as follows:

| Frequency | 10-mc./sec. (First Modulator) 41 | 1-mc./sec. (Second Modulator) 42 | 0.1-mc./sec. (Third Modulator) 43 |
|---|---|---|---|
| AB. CO | Balanced | Balanced | Unbalanced. |
| AB. 00 | do | Unbalanced | |
| AO. 00 | Unbalanced | | |

A desired frequency may be generated with proper sideband separation by the following method. In accordance with this method, any four digit frequency *AB, CD* mc./sec. may be synthesized or generated from the most advantageously chosen harmonics from the following relation:

$$AB,\ CD \text{ mc.} = \{10.00M \pm [1.00N \pm (0.10P \pm 0.01Q)]\} \text{ mc.} \quad \text{Relation (1)}$$

where M, N, P, and Q are "harmonic order" designating digits, corresponding to but not necessarily the same as A, B, C, and D, respectively. The digits M, N, P, and Q each have four possible relationships to the corresponding digits A, B, C, and D, respectively. For example, N will equal in all cases one of the following four possibilities:

(1) $B$=the harmonic order corresponding to the digit;
(2) $B+1$=the harmonic order corresponding to the digit advanced by one;

(3) $10-B$=the harmonic order corresponding to ten minus the digit; or
(4) $10-(B+1)$=the harmonic order corresponding to ten minus "the digit advanced by one."

There is one important exception to this, however, in that, in the synthesizing of 10 to 50 mc./sec., cases (3) and (4) do not exist for digit A, that is, in all cases M will equal A or A+1. The "harmonic order" is the harmonic selected from a harmonic selector; in the case of digit B this is the units selector 30.

The rules for making a proper choice of harmonic, or "harmonic order," in every case are as follows:

1. *Harmonic order (M) of 10 mc./sec.*

(1) The harmonic order corresponds to the first digit (A) when the second (B) digit is:

(*a*) 5 to 9;
(*b*) 0 followed by 0 in the third (C) and fourth (D) places.

(2) The harmonic order corresponds to the first digit advanced by one (A+1) when the second (B) digit is:

(*a*) 1 to 4;
(*b*) 0 not followed by 0 in the third (C) and fourth (D) places.

*Harmonic Order (N) of 1.0 mc./sec.*

(1) The harmonic order corresponds to the second digit (B) when the second (B) digit is:

(*a*) 0, or 5 to 9, followed by 0 in the third (C) and fourth (D) places;
(*b*) 5 to 9 followed by 5 to 9 in the third (C) place.

(2) The harmonic order corresponds to ten minus the second digit (10—B) when the second (B) digit is:

(*a*) 0 followed by 5 to 9 in the third (C) place;
(*b*) 1 to 4 followed by 0 in both the third (C) and fourth (D) places, or by 5 to 9 in the third (C) place.

(3) The harmonic order corresponds to the second digit advanced by one (B+1) when the second (B) digit is:

(*a*) 5 to 9 followed by 0 in the third (C) place but not by 0 in the fourth (D) place;
(*b*) 5 to 9 followed by 1 to 4 in the third (C) place.

(4) The harmonic order corresponds to ten minus "the second digit advanced by one" [10—(*B*+1)] when the second (B) digit is:

(*a*) 0, or 1 to 4, followed by 0 in the third (C) place, but not by 0 in the fourth (D) place;
(*b*) 0, or 1 to 4, followed by 1 to 4 in the third (C) place.

3. *Harmonic order (P) of 0.1 mc./sec.*

(1) The harmonic order corresponds to the third digit (C) when the third (C) digit is:

(*a*) 0 followed by 0 in the fourth (D) place:
(*b*) 5 to 9 followed by 0 or 5 to 9 in the fourth (D) place.

(2) The harmonic order corresponds to ten minus the third digit (10—C) when the third (C) digit is:

(a) 0 followed by 5 to 9 in the fourth (D) place;
(b) 1 to 4 followed by 0 or 5 to 9 in the fourth (D) place.

(3) The harmonic order corresponds to the third digit advanced by one $(C+1)$ when the third (C) digit is:

(a) 5 to 9 followed by 1 to 4 in the fourth (D) place.

(4) The harmonic order corresponds to ten minus "the third digit advanced by one" $[10-(C+1)]$ when the third (C) digit is:

(a) 0 followed by 1 to 4 in the fourth (D) place;
(b) 1 to 4 followed by 1 to 4 in the fourth (D) place.

*4. Harmonic order (Q) of 0.01 mc./sec.*

(1) The harmonic order corresponds to the fourth digit (D) when the fourth (D) digit is 0, or 5 to 9.

(2) The harmonic order corresponds to ten minus the fourth digit $(10-D)$ when the fourth (D) digit is 1 to 4.

To determine the algebraic signs, (+) or (—), in Relation 1 above, the following rules apply:

The sign in any position is:

(a) (+) when the harmonic order (M, N, or P) immediately preceding it is:

(1) the digit (A, B, or C), or
(2) ten minus "the digit (A, B, or C) advanced by one."

(b) (—) when the harmonic order (M, N, or P) immediately preceding it is:

(1) the digit (A, B, or C) advanced by one, or
(2) ten minus the digit.

For example: 45.23 mc./sec. is synthesized as follows:

$45.23 \text{ mc.} = 40 + [6.00 - (.70 + .07)]$, where
$40 = A + O$,
$6.00 = B + 1$,
$0.70 = 10 - (C+1)$, and
$0.07 = 10 - D$.

Fig. 2 shows the schematic wiring diagram of a switching device, or harmonic computer, which automatically selects the proper harmonics, algebraic signs of filters, and balance and unbalance of modulators in accordance with the above method by merely setting up a desired frequency on four decade dials. The proper combination is selected to yield best possible separation of all sidebands, in accordance with the rules set forth above, and the synthesizing of any one of the frequencies available from the frequency generator is rendered very simple; the rules do not have to be referred to.

The computer shown in Fig. 2 provides four decade ganged switch banks, A, B, C, and D, corresponding to the tens, units, tenths, and hundredths digits, respectively, of the frequency sought to be generated, and a frequency AB.CD is provided by setting up the A digit on the A decade, the B digit on the B decade, the C digit on the C decade, and the D digit on the D decade. The A decade has two switch banks 71 and 72, the B decade has three switch banks 73, 74, and 75, the C decade has three switch banks 76, 77, and 78, and the D decade has two switch banks 81 and 82. The switch banks are all of the type wherein any one of ten switch contacts, labelled 0, 1, 2, 3, 4, 5, 6, 7, 8, and 9 in each bank, may be connected to a rotatable contactor 71A, 72A, 73A, 74A, 75A, 76A, 77A, 78A, 81A, or 82A to complete any one of ten circuits. Only those switch contacts are used on each switch bank which will accomplish the purposes of the computer as a whole.

The choice of harmonics from the tens harmonic selector 31 of Fig. 1 is controlled by decade A, from the units harmonic selector 30 by decade B, from the tenths harmonic selector 32 by decade C, and from the hundredths harmonic selector 33 by decade D. In each decade, the rotatable contactors make contact with the same switch contacts in all the switch banks of the decade at the same time.

In decade A, the terminals of the tens harmonic selector 31 are connected to the first and second switch banks 71 and 72, respectively, as follows:

| Terminal of Tens Harmonic Selector 31 | Connected to Switch Contact #— | |
|---|---|---|
| | Of First Bank 71 | Of Second Bank 72 |
| 1 | 1 | ---------- |
| 2 | 2 | 1 |
| 3 | 3 | 2 |
| 4 | 4 | 3 |
| 5 | 5 | 4 |

It will be noted that, while the first bank 71 selects a particular harmonic, or digit, the second bank 72 selects that harmonic increased by one, and in this connection it should be recalled that these two choices correspond to the two possible relations that "M" may bear to "A" in Relation 1. One or the other of the two switch banks 71 and 72 is connected to the first balanced modulator 41 at the input terminal 35 thereof through a single pole double throw switch 91, operated by a relay R1, in a manner that will become apparent as the discussion proceeds.

A battery 90, connected at one side to ground, furnishes power to energize all the relays in Fig. 2. The battery furnishes the voltage for unbalancing the various modulators and controlling the algebraic signs, (+) or (—), of the various sideband filters.

In decade B, the terminals of the units harmonic selector 30 are connected to the first and second switch banks 73 and 74, respectively, as follows:

| Terminal of Units Harmonic Selector 30 | Connected to Switch Contact #— | |
|---|---|---|
| | Of First Bank 73 | Of Second Bank 74 |
| 5 | 5 | 4 |
| 6 | 4, 6 | 3, 5 |
| 7 | 3, 7 | 2, 6 |
| 8 | 2, 8 | 1, 7 |
| 9 | 1, 9 | 0, 8 |
| 10 | 0 | 9 |
| 0 | 0 | ---------- |

Here the first bank 73 selects the harmonic order N corresponding to the digit "B" or to ten minus the digit $(B-1)$, while the second bank selects the harmonic order N corresponding to the digit increased by one $(B+1)$, or to ten minus "the digit increased by one" [10−(B+1)], in accordance with the rules set forth above concerning the relationship between "N" and "B" in Relation 1. The third switch bank 75 of decade B energizes relay R1 from the battery 90 when decade B is in any one of the first, second, third, or fourth switch positions.

When relay R1 is energized, decade A selects a harmonic order "M" of 10 mc./sec. corresponding to the digit "A" advanced by one, and applies this selection to the first balanced modulator 41, and, through a second single-pole, double-throw switch 92 operated by relay R1, the negative (−) terminal 56 of the third sideband filter 55 is energized and the third sideband filter 55 is conditioned to furnish a difference frequency. When the relay R1 is deenergized, decade A selects a harmonic order "M" of 10 mc./sec. corresponding to the digit "A," the positive (+) terminal 57 of the third sideband filter 55 is energized from the battery 90, and the third sideband filter 55 furnishes a sum frequency.

Relay R2 controls first and second single-pole double-throw switches 93 and 94, connected to the first and third switch banks 73 and 75, respectively, of decade B. When decade B is in the "zero" switch position, that is, when digit "B" is zero, and relay R2 is not energized, relay R1 is energized through the third bank 75 of decade B and the second switch 94, and the tenth harmonic terminal of the units selector 30 is connected to the "zero" position switch contact of the first bank 73 through the first switch 93. But when, with the same setting of decade B, relay R2 is energized, the second switch 94 connects the unbalance terminal 61 of the first modulator 41 to the battery 90, to unbalance the modulator, and the first switch 93 connects the "zero" terminal of the units harmonic selector 30 to the "zero" contact of the first bank 73 of decade B in place of the tenth harmonic terminal of that selector. The energization of relay R2 is controlled by the "zero" switch contact of the third switch bank 78 of decade C and another relay R5, as will be explained below.

The rotatable contractors 73A and 74A of the first and second switch banks of decade B are connected to a single-pole double-throw switch 95, which selects one of them for connection to the input terminal 36 of the second balanced modulator 42, in accordance with the condition of a third relay R3 which is similar in purpose to the first-mentioned relay R1. The third relay R3 controls two single-pole double-throw switches 95 and 96, of which the latter 96 controls the connection of one or the other of the two control terminals 51 and 52 of the second sideband filter 50 (Fig. 1) to the battery 90. A fourth relay R4, which is energized simultaneously with the first relay R1, through the same switch bank 75 of decade B, controls a double-pole double-throw switch 97, the function of which is to reverse the algebraic sign of the second sideband filter 50 from that established by the third relay R3 under certain conditions. Energization of the third relay R3 is controlled by the third switch bank 78 of decade C in a like manner as the third switch bank 75 of decade B controls the energization of the first relay R1.

In decade C, the terminals of the tenths harmonic selector 32 are connected to the first and second switch banks 76 and 77 as follows:

| Terminal of Tenths Harmonic Selector 32 | Connected to Switch Contact #— | |
|---|---|---|
| | Of First Bank 76 | Of Second Bank 77 |
| 5 | 5 | 4 |
| 6 | 4, 6 | 3, 5 |
| 7 | 3, 7 | 2, 6 |
| 8 | 2, 8 | 1, 7 |
| 9 | 1, 9 | 0, 8 |
| 10 | 0 | 9 |
| 0 | 0 | --------- |

From this chart it can be seen that decade C is connected to the tenths harmonic selector 32 in the same way as decade B is connected to the units harmonic selector 30. The first and second banks 76 and 77 make the same harmonic selections for digit "C" as the corresponding banks 73 and 74 respectively make for digit "B." The fifth relay R5 controls first and second single-pole double-throw switches 103 and 104 which correspond in function to first and second switches 93 and 94, respectively, controlled by the third relay R3. The first switch 103 connects the "zero" terminal of the tenths harmonic selector 32 to the zero position switch contact of the first bank 76 of decade C in place of the tenth harmonic terminal of that selector when the fifth relay R5 is energized. The second switch connects the unbalance terminal 62 of the second modulator 42 to the battery 90 and energizes the second relay R2 when the fifth relay R5 is energized and decade C is set on zero. The fifth relay R5 is energized through the second bank 82 of decade D when the fourth digit "D" is "zero"; and at the same time the same decade D switch connection connects the unbalance terminal 63 of the third modulator 43 to the battery 90.

The tenths harmonic selected is connected to the first input terminal 37 of the third balanced modulator 43 through either the first or the second switch bank 76 or 77 of decade C by way of a single-pole double-throw switch 105, which connects one bank or the other to that input terminal under the control of a sixth relay R6. This relay R6 controls two single-pole double-throw switches 105 and 106, of which the latter 106 selects the algebraic (+) or (−) of the first sideband filter 45 by connecting one or the other of the control terminals 46 and 47 thereof to the battery 90. Energization of the sixth relay R6 is controlled by the second switch bank 82 of decade D, the relay being energized when the fourth, or "D" digit is 1, 2, 3, or 4. A seventh relay R7 is energized simultaneously with the third relay R3 through the third switch bank 78 of decade C, and controls a double-pole double-throw switch 107 to reverse the sign of the first sideband filter 45 when the third relay R3 is energized.

In decade D, the terminals of the hundredths harmonic selector 33 are connected to the first bank 81 as follows:

| Terminal of Hundredth Harmonic Selector 33 | Connected to Switch Contact # |
|---|---|
| 5 | 5 |
| 6 | 4, 6 |
| 7 | 3, 7 |
| 8 | 2, 8 |
| 9 | 1, 9 |
| 0 | 0 |

The selected harmonic is brought directly to the second input terminal 33 of the third balanced modulator 43.

It should be noted that, when the "D" digit is "zero," the third modulator 43 is unbalanced, and the fifth relay R5 is energized. Energization of the fifth relay R5 sets up that relay's second switch 104 so that, if the "C" digit is zero, the second modulator 42 is unbalanced and the second relay R2 is energized. Energization of the second relay R2 sets up that relay's second switch 94 so that, if the "B" digit is zero, the first modulator 41 is unbalanced. The second and fifth relys R2 and R5 may thus aptly be termed the "zero digit" relays.

The operation of the harmonic computer of Fig. 2 can best be understood further from a discussion of a few examples of specific frequencies chosen by means of it. Consider the frequency 28.63 mc./sec., for example. Decade A is set on 2, decade B on 8, decade C on 6, and decade D on 3. The frequency generator of Fig. 1 now furnishes 28.63 mc./sec. at the output thereof. This comes about as follows.

Decade D being set on 3, harmonic order indicator "Q" in Relation 1 is 7 (which is 10−3). The sixth relay R6 is energized, so that the second switch bank 77 of decade C is connected to the third modulator 43. Decade C being set on 6, harmonic order indicator "P" in Relation 1 is 7 (which is 6+1). The third and seventh relays R3 and R7 are not energized, so the sign of the first sideband filter 45 is (−) and the first switch bank 73 of decade B is connected to the second balanced modulator 42. Decade B being set on 8, harmonic order indicator "N" in Relation 1 is 8. The first and fourth relays R1 and R4 are not energized, so the signs of the second and third sideband filters 50 and 55 are both (+), and the first switch bank 71 of decade A is connected to the first modulator 41. Decade A being set on 2, harmonic order indicator "M" in Relation 1 is 2. The harmonics that are combined to synthesize 28.63 mc./sec. are then, in accordance with Relation 1, $$20+[8+(0.7-0.07)]\text{ mc./sec.}$$

This yields 28.63 mc./sec., and the separation is good, as will be shown in detail below.

In the above example, the zero digit relays were not used, because there were no zeros in the frequency considered. Consider now the frequency 41.00 mc./sec. Decade D is set on 0, so that "Q" is 0. The sixth relay R6 is not energized, but the fifth relay R5 is energized and the third modulator 43 is unbalanced, and the sign of the first sideband filter 45 is of no consequence. The first bank 76 of decade C is connected to the first input terminal 37 of the third modulator 43 through the first switch 105 controlled by the sixth relay R6. Decade C is set on 0, so that "P" is 0, due to the condition of the switches 103 and 104 of the fifth relay R5. The second 104 of these switches effects the unbalancing of the second modulator 42, and the sign of the second sideband filter 50 is also of no consequence. The third relay R3 is not energized. The first switch bank 73 of decade B is connected to the input terminal 36 of the second modulator 42 through the first switch 95 of the third relay R3. Decade B is set on 1, so that "N" is 9 (which is 10−1), and the consequences of relay R2 being energized are none for the two switches 93 and 94 thereof are in the circuit only when decade B is set on zero. The first and third relays R1 and R3 are energized, however, so that the sign of the third sideband filter 55 is (−). Since the sign of the second sideband filter 50 is of no consequence, energization of the third relay R3 has no effect on this operation. The second switch bank of decade A is connected to the input terminal 35 of the first modulator 41 through the first switch 91 of the third relay R3. Decade A is set on 4, so that "M" is 5 (which is 4+1). The harmonics that are combined to synthesize 41.00 mc./sec. are then, in accordance with Relation 1, $$50-[9+(0+0)]=41.00\text{ mc./sec.}$$

The separation in this case is 18 mc./sec., which is very good.

As pointed out above, the separation of the sum and difference frequencies furnished by any one of the modulators 41, 42, or 43 should be at least as great as the spread between two adjacent harmonic orders of the higher decade frequency generator 10, 11, 12, or 13 employed to actuate the modulator. For example, where tenths and hundredths are combined in a modulator, the sum and difference frequencies should be at least a tenth of a megacycle part; or, when tens and units are combined, the sum tnd difference frequencies should be at least ten megacycles apart. Separation in the sideband filters is then readily accomplished. In the first example given above, the separation between the sum and difference frequencies furnished when 0.7 and 0.07 mc./sec. are combined is $$0.77-0.63=0.14$$

which is greater than 0.1 The separation between the sum and difference frequencies furnished when 8.0 and 0.63 mc./sec. are combined is $$8.63-7.37=1.26$$

which is greater than 1.0. The separation between the sum and difference frequencies furnished when 20 and 8.63 mc./sec. are combined is $$28.63-11.37=17.26$$

which is greater than 10. In the second example, the separation between 59 and 41 mc./sec. is 18 mc./sec., which again is greater than 10. The apparatus is designed to yield in each case a separation which, though it may in a particular case be equalled, cannot be improved upon.

Many modifications and variations of this invention will occur to those skilled in the art, for the particular frequency generator shown in Fig. 1 and harmonic computer shown in Fig. 2 illustrate only one example of how the invention may be practiced.

For example, the computer of Fig. 2 may be arranged so that each of the terminals of the various harmonic selector switches is connected to a lamp that is provided with an indicator to show the frequency that is being selected, instead of being connected directly to the frequency generator. If the sideband filter terminals 46, 47, 51, 52, 56 and 57 and the unbalance terminals 61, 62 and 63 of the computer are likewise arranged, the solution to any frequency synthesis problem that can be set up on the computer will be indicated by illuminated characters and signs. This solution may then be used as desired. Further, the four decades A, B, C, and D may be operated by a telephone dial and "stepping" switches, well known to the telephone art, so that the setting up of a desired frequency then involves only the dialing of the digits of that frequency. Still further, the number of digits in a frequency sought to be synthesized by means of a computer in accordance with this invention is not limited to four; it may be any number greater or lesser. The computer may be constructed with more or fewer decades A, B, C, or D, it being particularly noteworthy that decades B and C are similar, and more like them may be added. All that is required is to set up the necessary rules for frequency synthesis in accordance with the method set forth herein, and to construct the switching circuits in accordance with these rules. Actually, the decade system is not the only system that can be used, although it is the most convenient. A system based on any other number grouping may be used if desired, for example a system in which eights instead of tens are the basis from which harmonics are generated. However, a system of tens offers the greatest simplicity, since it so closely resembles the decade system used in numerical representation.

The invention may have particular commercial value, for example, in the taxicab or trucking business, where each vehicle in the field may have a receiver and transmitter set up on an individual frequency, and the main office may have a transmitter and receiver that is automatically tunable to a master oscillator frequency. Then a computer in accordance with the invention, if equipped with a telephone dial, may be used to control a frequency generator like that shown in Fig. 1, which in turn may be used as the master oscillator, to enable the main office to call any vehicle in the field in the same manner as one places a dial telephone call.

It is therefore desired that the appended claims shall be given a broad interpretation commensurate with the scope of the invention within the art.

What is claimed is:

1. In the generation of a frequency AB cycles per unit time, where A and B are digits, by the combination of two individual frequencies M and N in the manner $M \pm N$, a switching system for automatically selecting values of said individual frequencies M and N and the algebraic sign (+) or (—) comprising first switch means having a plurality of circuits making contacts for selecting the first individual frequency M when set on one contact in accordance with the first digit A, second switch means having a plurality of circuits making contacts for selecting the second individual frequency N when set on one contact in accordance with the second digit B, and relay operated switch means controlled by both said first and second switch means and arranged to select said algebraic sign (+) or (—) in accordance with the settings of both said first and second switch means, both said first and second switch means being arranged so that at all times the difference between $M+N$ and $M-N$ is at least as great as the difference between the frequencies $(A \pm 1)$ $B$ and $AB$, where $(A \pm 1)$ $B$ is the frequency AB changed by one digit in the first place.

2. In the generation of a frequency AB cycles per unit time, where A and B are digits, by the combination of two individual frequencies M and N in the manner $M \pm N$, a switching system for automatically selecting values of said individual frequencies M and N and the algebraic sign (+) or (—) comprising first switch means having a plurality of circuit-making contacts for selecting the first individual frequency M when set on one contact in accordance with the first digit A, second switch means having a plurality of circuit-making contacts for selecting the second individual frequency N when set on one contact in accordance with the second digit B, first relay operated switch means controlled by said second switch means and arranged to condition the selection of said first switch means in accordance with the setting of said second switch means, and second relay operated switch means controlled by both said first and second switch means and arranged to select said algebraic sign (+) or (—) in accordance with the settings of both said first and second switch means, both said first and second switch means being arranged so that at all times the difference between $M+N$ and $M-N$ is at least as great as the difference between the frequencies $(A \pm 1)$ $B$ is the frequency AB changed by one digit in the first place.

3. In combination with a frequency generator which is adapted to generate a frequency AB cycles per unit time, where A and B are digits, by the combination of two individual frequencies M and N in the manner $M \pm N$, a switching system for automatically conditioning said generator to provide said individual frequencies M and N with a predetermined sign (+) or (—) comprising first switch means having a plurality of circuit-making contacts connected to said generator and adapted to condition said generator to provide the first individual frequency M when set on one contact in accordance with the first digit A, second switch means having a plurality of circuit-making contacts connected to said generator and adapted to condition said generator to provide the second individual frequency N when set on one contact in accordance with the second digit B, and relay operated switch means controlled by both said first and second switch means and connected to said generator and adapted to condition said generator to combine said individual frequencies M and N either additively or subtractively in accordance with the settings of both said first and second switch means, both said first and second switch means being arranged so that at all times the difference between $M+N$ and $M-N$ is at least as great as the difference between the frequencies $(A \pm 1)$ $B$ and $AB$, where $(A \pm 1)$ $B$ is the frequency AB changed by one digit in the first place.

4. In the generation of a frequency AB cycles per unit time, where A and B are digits, by the combination of two individual frequencies M and N in the manner $M \pm N$, apparatus for choosing most advantageous values for M and N which comprises means settable in accordance with the first digit A for relating M to A in one of four fashions, $M=A$, $M=A+1$, $M=10-A$, or $M=10-(A+1)$; means settable in accordance wtih the second digit B for relating N to B in one of four similar fashions, $N=B$, $N=B+1$, $N=10-B$, or $N=10-(B+1)$; and means responsive to the settings of said settable means to select the algebraic sign between the M and N as selected by said settable means, said settable means being constructed and arranged to select values of M and N such that either $M+N$ or $M-N$ yields the frequency AB cycles per unit time and the separation between $M+N$ and $M-N$ is a maximum.

5. In the generation of a frequency ABCD cycles per unit time where A, B, C, and D are digits by synthesis from four frequencies M, N, P, and Q which are respectively harmonic orders of four basic frequency generators that are related to each other in decade fashion in the manner $M \pm [N \pm (P \pm Q)]$, apparatus for choosing the most advantageous values for M, N, P, and Q and the most advantageous algebraic signs which comprises means settable in accordance with the first digit A for relating M to A in one of four fashions $M=A$, $M=A+1$, $M=10-A$, or $M=10-(A+1)$; means settable in accordance with the second digit B for relating N to B in one of four similar fashions $N=B$, $N=B+1$, $N=10-B$, or $N=10-(B+1)$; means settable in accordance with the third digit C for relating P to C in one of four similar fashions $P=C$, $P=C+1$, $P=10-C$, or $P=10-(C+1)$; means settable in accordance with the fourth digit D for relating Q to D in one of four similar fashions $Q=D$, $Q=D+1$, $Q=10-D$, or $Q=10-(D+1)$; and means responsive to the settings of said settable means to select the algebraic sign between P and Q as set by said C and D settable means, between $P \pm Q$ and N as set by said B settable means, and between $(P \pm Q) \pm N$ and $M$ as set by said A settable means, said settable means being constructed and arranged to select values of M, N, P, and Q which provide the maximum separation between the sum and the difference in each algebraic operation, and said algebraic sign setting means being constructed and arranged to provide that the algebraic sign in each position shall be plus when the harmonic order M, N, or P preceding that sign is equal to the corresponding digit A, B, or C respectively or 10−(that digit+1), and minus when said harmonic order is equal to the corresponding digit +1 or 10−(the corresponding digit).

6. In combination with a frequency generator which is adapted to generate a frequency AB cycles per unit time, where A and B are digits, by the combination of two individual frequencies M and N in the manner $M \pm N$, a balanced modulator wherein said individual frequencies are combined to produce the frequencies $M+N$ and $M-N$, means in circuit with said modulator for selecting one of said products, and means in circuit with said modulator for causing the unbalance thereof, a switching system connected to said generator and modulator and governing the operation thereof comprising first switch means having a plurality of circuit making contacts connected to said generator and adapted to condition said generator to provide the first individual frequency M when set on one contact in accordance with the first digit A, second switch means having a plurality of circuit-making contacts connected to said generator and adapted to condition said generator to provide the second individual frequency N when set on one contact in accordance with the second digit B, first relay operated switch means controlled by said switch means and connected to said modulator and adapted to condition said modulator to combine said individual frequency M and N either additively or subtractively in accordance with the setting of both first and second switch means, and second relay operated switch means controlled by said first and second switch means and connected to the unbalancing means of said modulator, and arranged to unbalance said modulator when one of said digits is zero.

KENNETH A. YOUNG.

REFERENCES CITED

The following references are of record in the file of this patent:

UNITED STATES PATENTS

| Number | Name | Date |
|---|---|---|
| 2,131,558 | Granger | Sept. 27, 1938 |
| 2,231,634 | Monk | Feb. 11, 1941 |
| 2,401,604 | Bligh et al. | June 4, 1946 |
| 2,450,696 | Stenning | Oct. 5, 1948 |